US011445145B2

(12) United States Patent
Jiang et al.

(10) Patent No.: US 11,445,145 B2
(45) Date of Patent: Sep. 13, 2022

(54) METHOD AND DEVICE FOR CONTROLLING CAMERA SHOOTING, SMART DEVICE AND COMPUTER STORAGE MEDIUM

(71) Applicant: SHENZHEN GRANDSUN ELECTRONIC CO., LTD., Shenzhen (CN)

(72) Inventors: Dejun Jiang, Shenzhen (CN); Haiquan Wu, Shenzhen (CN); Enqin Zhang, Shenzhen (CN); Lei Cao, Shenzhen (CN); Ruiwen Shi, Shenzhen (CN)

(73) Assignee: SHENZHEN GRANDSUN ELECTRONIC CO., LTD., Shenzhen (CN)

( * ) Notice: Subject to any disclaimer, the term of this patent is extended or adjusted under 35 U.S.C. 154(b) by 770 days.

(21) Appl. No.: 16/375,399

(22) Filed: Apr. 4, 2019

(65) Prior Publication Data
US 2019/0313057 A1    Oct. 10, 2019

(30) Foreign Application Priority Data
Apr. 4, 2018 (CN) .......................... 201810300875.1

(51) Int. Cl.
*G10L 15/00* (2013.01)
*H04N 7/15* (2006.01)
(Continued)

(52) U.S. Cl.
CPC ............... *H04N 7/15* (2013.01); *G10L 15/02* (2013.01); *G10L 15/063* (2013.01); *G10L 15/22* (2013.01);
(Continued)

(58) Field of Classification Search
CPC ......... G10L 15/26; G10L 15/02; G10L 15/16; G10L 15/144; G10L 15/146;
(Continued)

(56) References Cited

U.S. PATENT DOCUMENTS 7,518,631 B2 * 4/2009 Hershey .................. G10L 15/26
348/14.1
8,508,576 B2 * 8/2013 Liu .......................... H04N 7/15
348/14.09
(Continued)

FOREIGN PATENT DOCUMENTS

| CN | 102256098 A | 11/2011 |
|----|-------------|---------|
| CN | 106888361 A | 6/2017 |
| CN | 107452372 A | 12/2017 |

OTHER PUBLICATIONS

Patel, N. V., & Sethi, I. K. (1997). Video shot detection and characterization for video databases. Pattern recognition, 30(4), 583-592. (Year: 1997).*

(Continued)

*Primary Examiner* — Edgar X Guerra-Erazo
(74) *Attorney, Agent, or Firm* — Steven M. Koehler; Westman, Champlin & Koehler, P.A.

(57) ABSTRACT

The present application relates to the technical field of communication, and provides a method and a device for controlling camera shooting, a smart device and a computer storage medium, including: collecting voice data of a sound source object; extracting a voice feature based on the voice data of the sound source object; determining a current voice scene according to the extracted voice feature and a voice feature corresponding to the preset voice scene; and acquiring a shooting mode corresponding to the current voice scene, and controlling movement of the camera according to the shooting mode corresponding to the current voice scene. With the method above, frequently shaking can be avoided, and shooting efficiency and user experience can be improved.

9 Claims, 5 Drawing Sheets

(51) Int. Cl.
*H04N 5/232* (2006.01)
*G10L 15/02* (2006.01)
*G10L 15/06* (2013.01)
*G10L 15/22* (2006.01)
*G10L 25/90* (2013.01)
*H04N 7/14* (2006.01)

(52) U.S. Cl.
CPC ......... *G10L 25/90* (2013.01); *H04N 5/23245* (2013.01); *H04N 5/23299* (2018.08); *H04N 7/147* (2013.01); *G10L 2015/223* (2013.01)

(58) Field of Classification Search
CPC . G10L 15/148; G10L 15/20; G10L 2015/221; G10L 15/222; G10L 2015/223; G10L 2015/225; G10L 2015/226; G10L 2015/227; G10L 2015/228; G10L 15/30; G10L 15/32; G10L 15/34; G10L 17/00; G10L 17/02; G10L 17/04; G10L 17/06; G10L 17/10; G10L 17/08; G10L 17/12; G10L 17/18; G10L 17/22; G10L 21/00; G10L 21/02; G10L 21/0272; G10L 21/028; G10L 21/0308; G10L 21/0316; G10L 21/0324; G10L 21/0332; G10L 21/034; G10L 21/0356; G10L 21/0364; G10L 21/04; G10L 21/055; G10L 21/049; G10L 21/047; G10L 21/045; G10L 21/057; G10L 21/06; G10L 21/10; G10L 2021/105; G10L 21/16; G10L 25/00; G10L 25/03; G10L 25/06; G10L 25/09; G10L 25/12; G10L 25/15; G10L 25/18; G10L 25/21; G10L 25/24; G10L 25/27; G10L 25/30; G10L 25/48; G10L 25/51; G10L 25/54; G10L 25/57; G10L 25/60; G10L 25/72; G10L 25/75; G10L 25/78; G10L 2025/783; G10L 2025/786; G10L 25/81; G10L 25/84; G10L 2025/932; G10L 25/93; G10L 2025/935; G10L 2025/937; G06V 10/82; G06V 40/28; G06V 10/10; G06V 10/16; G06V 10/17; G06V 10/20; G06V 10/26; G06V 10/267; G06V 10/273; G06V 10/30; G06V 10/32; G06V 10/42; G06V 10/48; G06V 10/70; G06V 10/74; G06V 10/764; G06V 10/765; G06V 10/77; G06V 10/771; G06V 10/7715; G06V 10/774; G06V 10/7747; G06V 10/778; G06V 10/7784; G06V 10/87; G06V 10/86; G06V 10/88; G06V 10/96; H04N 21/00; H04N 21/27; H04N 21/60; H04N 7/15
See application file for complete search history.

(56) References Cited

U.S. PATENT DOCUMENTS

| | | | |
|---|---|---|---|
| 9,398,258 B1 | 7/2016 | Cisco | |
| 10,248,862 B2* | 4/2019 | Sundaresan | G06V 20/20 |
| 10,917,577 B2* | 2/2021 | Zhang | H04N 5/23299 |
| 11,102,389 B2* | 8/2021 | Wakamatsu | H04N 5/23258 |
| 2008/0218582 A1 | 9/2008 | Buckler | |
| 2010/0123770 A1* | 5/2010 | Friel | H04N 7/15 348/240.99 |
| 2012/0033030 A1* | 2/2012 | Liu | H04N 7/15 348/E7.083 |
| 2013/0083153 A1* | 4/2013 | Lindbergh | H04N 7/15 348/E7.083 |
| 2016/0026866 A1* | 1/2016 | Sundaresan | G06Q 30/0631 705/26.7 |
| 2017/0034480 A1 | 2/2017 | Goto | |
| 2017/0264864 A1 | 9/2017 | McNelley | |
| 2018/0088581 A1* | 3/2018 | Freeman | B64C 39/024 |
| 2019/0188476 A1* | 6/2019 | Sundaresan | G06Q 30/0631 |
| 2019/0313031 A1* | 10/2019 | Zhang | G06V 40/161 |
| 2020/0228692 A1* | 7/2020 | Wakamatsu | H04N 5/23222 |
| 2020/0329202 A1* | 10/2020 | Toriumi | H04N 5/23299 |

OTHER PUBLICATIONS

Chen, Bo-Wei, Chen-Yu Chen, and Jhing-Fa Wang. "Smart homecare surveillance system: Behavior identification based on state-transition support vector machines and sound directivity pattern analysis." IEEE Transactions on Systems, Man, and Cybernetics: Systems 43.6 (2013): 1279-1289. (Year: 2013).*

Bernardin, Keni, and Rainer Stiefelhagen. "Audio-visual multi-person tracking and identification for smart environments." Proceedings of the 15th ACM international conference on Multimedia. 2007. (Year: 2007).*

I. K. Sethi, "Neural implementation of tree classifiers," in IEEE Transactions on Systems, Man, and Cybernetics, vol. 25, No. 8, pp. 1243-1249, Aug. 1995. (Year: 1995).*

Mizumoto, T., Nakadai, K., Yoshida, T., Takeda, R., Otsuka, T., Takahashi, T., & Okuno, H. G. (May 2011). Design and implementation of selectable sound separation on the Texai telepresence system using HARK. In 2011 IEEE International Conference on Robotics and Automation (pp. 2130-2137). IEEE. (Year: 2011).*

Nishiguchi, S., Higashi, K., Kameda, Y., & Minoh, M. (Jul. 2003). A sensor-fusion method for detecting a speaking student. In 2003 International Conference on Multimedia and Expo. ICME'03. Proceedings (Cat. No. 03TH8698) (vol. 1, pp. 1-129). IEEE. (Year: 2003).*

* cited by examiner

METHOD AND DEVICE FOR CONTROLLING CAMERA SHOOTING, SMART DEVICE AND COMPUTER STORAGE MEDIUM

CROSS REFERENCE

This application claims the priority of Chinese patent application No. 201810300875.1, filed on Apr. 4, 2018, the entire contents of which are incorporated herein by reference.

TECHNICAL FIELD

The present application relates to the technical field of communication, and more particularly to a method and a device for controlling camera shooting, a smart device and a computer storage medium.

BACKGROUND

At present, more and more smart devices are equipped with a microphone array, the voice angle information of the speaker when speaking can be acquired via the microphone array, and with these angle information, the camera can be moved to shoot the speaker when speaking, however the prior art has the following two problems:

1. Fast Positioning to the Sound Source and Slow Shooting Control

The witching of the sound field is completed in an instant, while the camera needs the orientation of the sound source calculated by the angle of the microphone array, and then the camera is rotated to reach the designated position, and this process needs a certain time. If the rotation speed is increased, since the video frame rate recorded by the camera is insufficient, which results in smearing of the picture shot by the camera, in addition, time delay exists and causes the audio and video to be out of sync, leaving uncomfortable feeling to the speaker.

2. For example, when a video conference is performed by a company, there is the case of frequent discussion of the participants. When a participant A expresses a viewpoint, the system calculates the position of the participant A and starts the shooting control, however, it is very likely that the participant A has finished, the camera has not been rotated to align the participant A, and at this time, a Participant B begins to express his viewpoint, the system calculates the position of the Participant B again, and controls the camera to rotate towards the direction of the Participant B. In this case, the camera will be shaken between different participants using simply follow of the camera before. This situation may cause the video conference very uncomfortable and unacceptable.

In summary, the existing shooting control adopts a single tracking method, which is difficult to meet the scheduling requirements of the scene, and cannot handle the contradiction between the fast switching of the voice during the synchronous communication of the video and audio and the rotation of the camera, and the camera will be shaken between multiple speakers when the multiple speakers are communicated due to frequently and fast moving the camera, and shooting control is not efficient.

SUMMARY

For this reason, the present application provides a method and a device for controlling camera shooting, a smart device and a computer storage medium, in order to solve the problem that the existing shooting control adopts a single tracking method, which is difficult to meet the scheduling requirements of the scene, and cannot handle the contradiction between the fast switching of the voice during the synchronous communication of the video and audio and the rotation of the camera, and the camera will be shaken between multiple speakers when the multiple speakers are communicated due to frequently and fast moving the camera, and shooting control is not efficient.

In a first aspect of the present application, a method for controlling camera shooting, the method includes steps of:
collecting voice data of a sound source object;
extracting a voice feature based on the voice data of the sound source object;
determining a current voice scene according to the extracted voice feature and a voice feature corresponding to a preset voice scene;
acquiring a shooting mode corresponding to the current voice scene, and controlling the movement of the camera according to the shooting mode corresponding to the current voice scene.

In a second aspect of the present application, a device for controlling camera shooting, the device includes:
a voice collection unit, configured to collect voice data of a sound source object;
a feature extraction unit, configured to extract a voice feature based on the voice data of the sound source object;
a scene determination unit, configured to determine a current voice scene according to the extracted voice feature and a voice feature corresponding to the preset voice scene; and
a orientation control unit, configured to acquire a shooting mode corresponding to the current voice scene, and control movement of the camera according to the shooting mode corresponding to the current voice scene.

In a third aspect of the present application, a smart device, comprising: a memory, a processor, and a computer program stored in the memory and executed by the processor, when the processor executes the computer program, the steps claimed in the first aspect are implemented.

In a fourth aspect of the present application, a computer storage medium, the computer storage medium is stored with a computer program, wherein when the computer program is executed by a processor, the steps claimed in the first aspect are implemented.

Compared with the prior art, the embodiment of the present application has the following beneficial effects: in the embodiment of the present application, the voice data of the sound source object is collected, and then the voice feature is extracted based on the voice data of the sound source object, and then the current voice scene is determined according to the extracted voice feature and the voice feature corresponding to the preset voice scene, and finally, the shooting mode corresponding to the current voice scene is acquired, and the camera is controlled to move according to the shooting mode corresponding to the current voice scene, and the camera uses different shooting modes to control the moving and rotation of the camera according to different voice scenes, which avoids the camera from rotating frequently when a plurality of participants are speaking at the same time, therefore, not only meet the shooting needs, but also improve the shooting efficiency and user experience.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION

In the following description, specific details such as specific system architectures, techniques, and the like are presented for better understood the embodiments of the present application and for purposes of illustration and not for limitation. However, it will be apparent to those skilled in the art that the present application may be practiced in other embodiments without these specific details. In other cases, detailed descriptions of well-known systems, devices, circuits, and methods are omitted so as not to obscure the description of the present application.

The embodiment of the present application provides a method and device for controlling camera shooting, a smart device, and a computer storage medium, in order to achieve tracking shooting in multiple scenes and avoid the camera shaking caused by rotating frequently, and reducing shooting efficiency, which by collecting the voice data of the sound source object, and extracting the voice feature based on the voice data of the sound source object, then determining the current voice scene according to the voice feature corresponding to the preset voice scene, and finally acquiring a shooting mode corresponding to the current voice scene, and controlling movement of the camera according to the shooting mode corresponding to the current voice scene. In order to specifically describe the above-described method and device for controlling camera shooting, a smart device, and a computer storage medium, the following description will be made by way of specific embodiments.

In order to explain the technical solution described in the present application, the following description will be made by way of specific embodiments.

Embodiment 1

Figure 1:
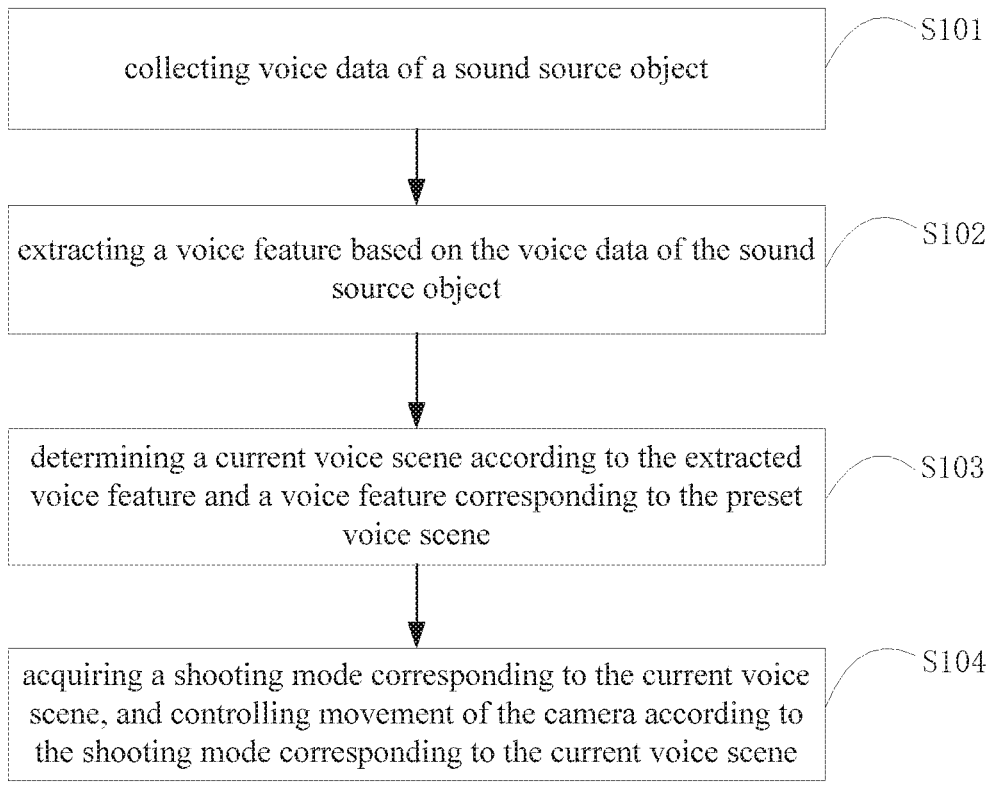
FIG. 1 is an implementation flowchart of a method for controlling camera shooting according to an embodiment of the present application.

FIG. 1 is an implementation flowchart of a method for controlling camera shooting according to an embodiment of the present application. The method includes steps S101 to S104. The specific implementation principles of each step are as follows:

Step S101, collecting voice data of a sound source object.

Specifically, in the current scene, the voice data of the sound source object is started to be collected after the user starts the smart device. The sound source object is a person who speaks in the current scene. The voice data includes a start time and an end time of the voice. In the embodiment of the present application, the microphone array is used to collect the voice in real time in all directions, and receive the voice data, then the sound source directions of the voice collected is required by the microphone array algorithm. A single microphone can only acquire sound information, and a microphone array composed of a plurality of microphones arranged according to a certain geometric position can acquire not only sound information but also spatial information of sound.

Step S102, extracting a voice feature based on the voice data of the sound source object.

Specifically, the voice feature is extracted based on the voice data of the collected sound source object. In the embodiment of the present application, the voice feature includes one or more of a voice duration, a voice interval duration, a sound source angle, a sound intensity of a voice, or a sound frequency of a voice. Similarly, the voice feature may also include pitch and audibility.

In the embodiment of the present application, the voice duration of the voice data is calculated according to the voice start time and the voice end time of the voice data. Recording the voice start time $T_{start-i}$ and the voice end time $T_{end-i}$ of the voice data collected, then the voice duration is $D_i = T_{end-i} - T_{start-i}$, and the voice interval duration is $E_i = T_{start-i} - T_{end-i-1}$, the number of the sound source angles of the voice data collected is counted, and the number of the sound source objects are determined according to the number of the sound source angles. Recording the sound source angle $A_i$, which is generally considered that the sound source object is fixed in a certain orientation, therefore, the number of the sound source objects can be determined according to the number of the sound source angles $A_i$. Acquiring the voice intensity or the sound frequency of the voice, and judging that with the same sound source angle, the sound intensity $I_i$ of the voice and sound frequency $F_i$ of a voice is a same sound source object. In addition, the sound source object may also move around for the convenience of communication, since the sound frequencies of different people are different, the sound intensity is also different, and the voice intensity and the sound frequency of the voice can be obtained to determine whether it is the same sound source object. It should be noted that, in the embodiment of the present application, determining the number of users is counting the number of sound source angles after eliminating shaking that refers to removing the sound source angle that difference is smaller than the preset difference, that is, the sound source angle which the difference is smaller than the preset difference is regarded as the sound source angle from the same sound source object.

Optionally, statistical analysis of the voice data is performed to extract more other voice features, for example, the user interaction frequency, which may be determined by dividing the number of user voice switching by the total time; the average voice duration, which can be determined by dividing the total voice duration by the number of voices; the average waiting time, which can be determined by dividing the total idle duration by the number of voices; the voice duration distribution, which can be expressed by the voice duration variance; the user angle distribution, which can be expressed by the user angle variance.

Step S103: determining a current voice scene according to the extracted voice feature and a voice feature corresponding to the preset voice scene.

Among them, the preset voice scenes includes but not limited to a speech scene(C lectures, A, B occasionally ask questions), a round table conference scene (A, B, C, sequential speak), and a video conference scene(A, B communicate with the remote users at a close distance).

Figure 2:
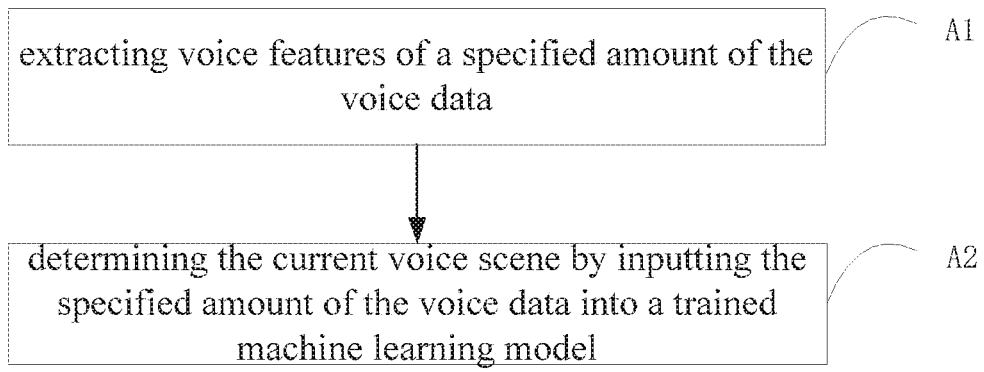
FIG. 2 is an implementation flowchart of a step S103 of a method for controlling camera shooting according to an embodiment of the present application.

As an embodiment of the present application, FIG. 2 shows a specific implementation flow of the method S103 for controlling camera shooting provided by the embodiment of the present application, which is described in detail as follows:

A1. extracting voice features of a specified amount of the voice data;

A2. determining the current voice scene by inputting the specified amount of the voice data into a trained machine learning model. The trained machine learning model refers to a machine learning model in which voice data in various voice scenes is pre-acquired as sample data and trained by using a machine learning algorithm. It should be noted that the sample data of each voice scene needs to be balanced so as not to affect the training result of the machine learning model. The machine learning algorithm may be a decision tree, a random forest algorithm, SVMs, naive Bayes, logistic regression or other machine learning algorithms, which are not limited herein.

In the embodiment of the present application, the microphone array of the smart device acquires the sound source angle in the period of time according to the record of the time period, and extracts the voice features of the voice source object number, the voice duration, the voice interval duration, and the voice exchange frequency and the like. The voice features extracted are inputted into the rained machine learning model for scene matching, then the voice scenes corresponding to the voice features are outputted by the trained machine learning model, then judging the voice scene is a speech scene, a round table conference scene, a video conference scene, or a family conversation scene.

Optionally, in the embodiment of the present application, the machine learning model may be trained by using a decision tree algorithm. The training steps of the machine learning model are as follows:

A21. acquiring a specified amount of sample voice data, and establishing a sample voice data set based on the sample voice data, wherein the sample voice data is marked with a voice scene, and the number of the sample voice data of each voice scene is no less than an average of the number of the sample voice data of each voice scene;

A22. extracting voice features according to the sample voice data, and establishing a feature vector set based on the voice features extracted;

A23. training a decision tree of the sample voice data set according to the feature vector set until an actual output value of the decision tree is the same as an ideal output value, and the training is completed.

Specifically, the process of training a machine learning model using a decision tree algorithm is a process of constructing a decision tree based on training data. In the embodiment of the present application, the voice features in the sample data, such as, the voice start time $T_{start-i}$, the voice end time $T_{end-i}$, the voice duration $D_i=T_{end-i}-T_{start-i}$, and the voice interval duration $E_i=T_{start-i}-T_{end-i-1}$ and the like are extracted, the voice features extracted are used to establish a feature vector set: $(T_{start-i}, T_{end-i}, A_i, I_i, F_i)$, the decision tree of the sample voice information set are trained according to the feature vector set. Similarly, in the embodiment of the present application, the voice feature of the feature vector set may further include a user interaction frequency, an average voice duration, and an average waiting duration, a voice duration distribution, and user angle distribution and the like.

Optionally, the step of determining a current voice scene according to the extracted voice feature and a voice feature corresponding to the preset voice scene includes:

acquiring a specified amount of a sample voice data;

determining a distribution of the sound source angle, a voice duration distribution, and a voice interval time of the sample voice data;

constructing a decision tree according to the distribution of the sound source angle, the voice duration distribution, and the voice interval time of the sample voice data acquired;

determining a current scene according to the decision tree constructed and the voice features acquired.

Specifically, the first node of the decision tree is constructed by using the distribution of the sound source angle. If the distribution of the sound source angle of the sample voice data is smaller than the preset angle distribution range, such as less than 90°, the current voice scene is determined to be a video conference scene. If the distribution of the sound source angle of the sample voice data is greater than or equal to a preset angle distribution range, such as greater than or equal to 90°, then further analyzing the voice duration distribution, if the same sound source object existing in the voice duration distribution exceeds the preset voice duration, the current voice scene is determined to be a speech mode. If there is no voice of the same sound source object exceeding the preset voice duration, then further analyzing the voice interval time, if the voice interval time is uniform, the current voice scene is determined to be a round table conference scene, if the voice interval time is uneven, the current voice scene is determined to be a family conference scene.

Optionally, the first node of the decision tree is constructed by using the distribution of the voice duration, if the voice duration of the same voice source object reaches the preset percentage of the current total voice duration (e.g., 90%), then the voice interval variance is acquired, if the voice interval variance is less than the preset interval variance threshold, the current speech scene is determined to be a round table conference scene, if the voice interval variance is greater than or equal to the preset interval variance threshold, then the distribution range of the sound source angle is acquired, if the distribution of the sound source angle does not reach the preset angle distribution range, the current voice scene is determined to be a video conference scene, if the distribution of the sound source angle reaches the preset angle distribution range, the current voice scene is determined to be a family conference scene.

Step S104: acquiring a shooting mode corresponding to the current voice scene, and controlling movement of the camera according to the shooting mode corresponding to the current voice scene.

In the embodiment of the present application, each voice scene has a corresponding shooting mode, and different shooting modes select different shooting strategies. For example, you can choose to only shoot the presenter, or control movement of the camera according to the speaking region, alternatively, control movement of the camera sequentially in a clockwise or a counterclockwise direction.

Figure 3:
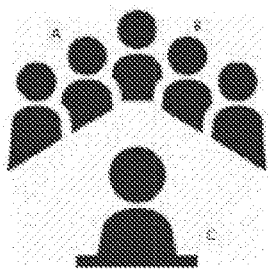
FIG. 3 is a schematic diagram of a scene of speakers according to an embodiment of the present application.

Optionally, in the embodiment of the present application, the speaker scene is as shown in FIG. 3, and the characteristics of the speaker scene are characterized by a large angular distribution of the sound source, but the difference in voice time distribution is extremely large, generally, most of the time (90% of the time) is that the presenter speaks alone at the podium. In this case, we generally think that the information of the presenter has spoken is the most important, the shooting strategy can be followed by the presenter to keep coherence, and ignore the occasional break of the host or the audience.

Figure 4:
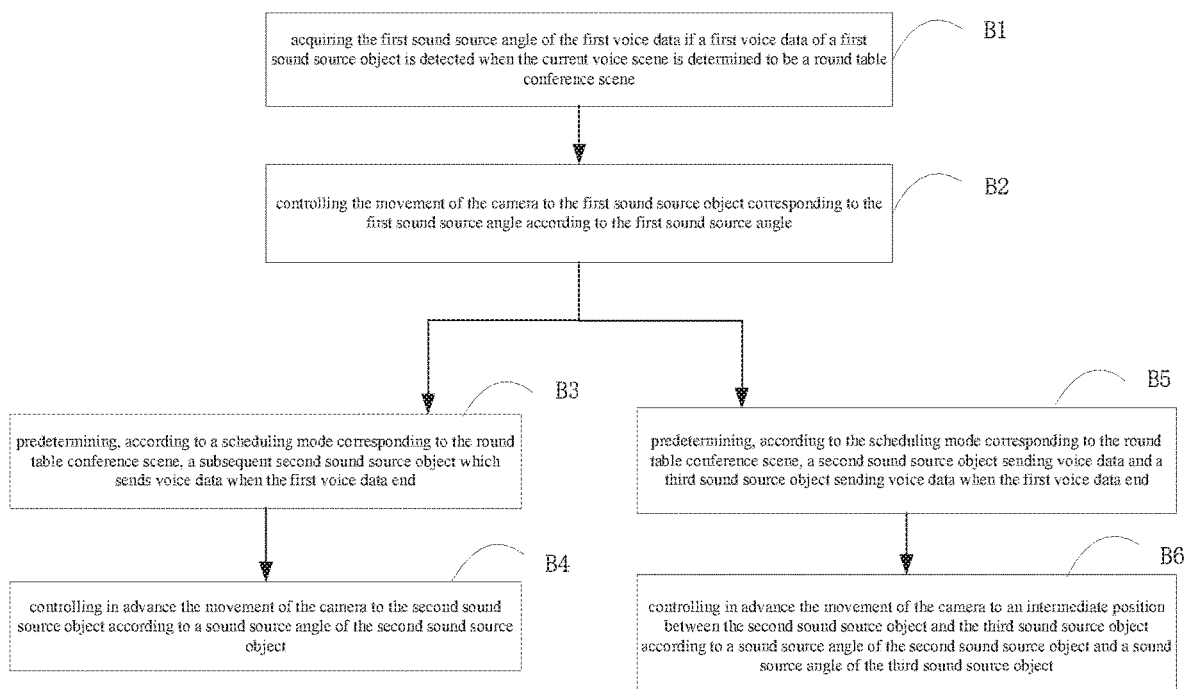
FIG. 4 is an implementation flowchart of a step S104 of a method for controlling camera shooting in a round table conference scene according to an embodiment of the present application.

As an embodiment of the present application, when the current voice scene is determined to be a round table conference scene, FIG. 4 shows a specific implementation flow of the methodS104 for controlling camera shooting provided by the embodiment of the present application, which is described in detail as follows:

B1. acquiring the first sound source angle of the first voice data if a first voice data of a first sound source object is detected when the current voice scene is determined to be a round table conference scene;

B2. controlling the movement of the camera to the first sound source object corresponding to the first sound source angle according to the first sound source angle;

B3. predetermining, according to a scheduling mode corresponding to the round table conference scene, a subsequent second sound source object which sends voice data when the first voice data end; the scheduling mode corresponding to the round table conference scene includes controlling the movement of the camera in a clockwise direction or controlling the camera movement in a counterclockwise direction.

B4. controlling in advance the movement of the camera to the second sound source object according to a sound source angle of the second sound source object; or The step S104 further includes:

B5. predetermining, according to the scheduling mode corresponding to the round table conference scene, a second sound source object sending voice data and a third sound source object sending voice data when the first voice data end;

B6. controlling in advance the movement of the camera to an intermediate position between the second sound source object and the third sound source object according to a sound source angle of the second sound source object and a sound source angle of the third sound source object.

Figure 4A:
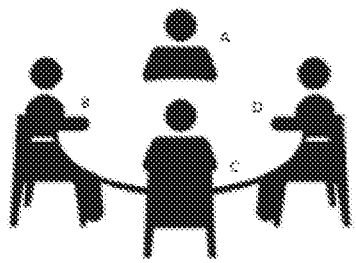
FIG. 4a is a schematic diagram of a round table conference scene according to an embodiment of the present application.

In the embodiment of the present application, the round table conference scene is as shown in FIG. 4a. The characteristics of the round table conference scene are characterized by large angular distribution of the sound source, uniform voice interval, uniform distribution of voice duration and interval duration, and the information of each person is equally important, the suitable camera shooting strategy is to follow as much as possible according to the change in voice angle. Further, predicting the next sound source object when the voice interval time is large, and controlling the camera to rotate in advance. For example, after the A finished speaking is generally B or C continues, then we can schedule the camera to the middle of B and C in advance.

Illustratively, a certain amount of voice data is collected, and the sound source angle of the voice data is subjected to shaking elimination processing. For example, the microphone array voice angle accuracy is 10 degrees, and we can treat the voice within 10 degrees as the same voice of the sound source object. As shown in FIG. 4a, A is 0 degree starting point, and if the sound source angle comes from 85-95 degrees clockwise, it is considered that D is speaking. Comparing the change of the sound source angle of the current voice and the last voice, if the sound source angle is unchanged, it is considered that the previous sound source object continues speaking and does not process. If the angle change is found, we think that an exchange occurs, and the variable is set to identify the sequence of speaking, that is, the number of speaking times of the same sound source object after the current sound source object is finished speaking, for example, C continues after D finished, then the variable of identification that C continues after D finished will be incremented by 1. The identification can be saved by a two-dimensional array or scale. After accumulating a certain amount of voice data (such as 100 voice switches), by retrieving all variables identifying the sequence of speaking, the sound source object corresponding to the variable with the largest variable value is selected as the most likely next sound source object sending a next voice data (speaking), and the camera is controlled to be turned to the next sound source object. Alternatively, the sound source object corresponding to the variable with the largest variable value and the sound source object corresponding to the variable having the second largest variable value are selected as the two sound source objects most likely to speak, and the camera is controlled to be turned to the middle of the two sound source objects in advance.

Figure 5:
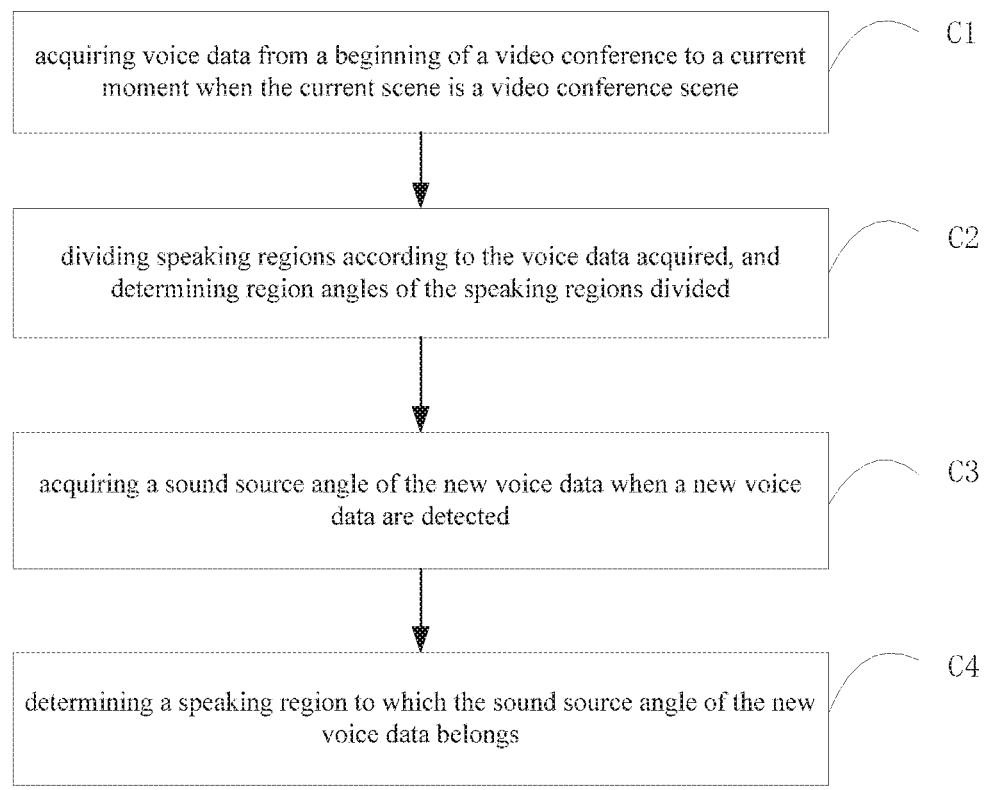
FIG. 5 is an implementation flowchart of a step S104 of a method for controlling camera shooting in a video conference scene according to camera shooting control method according to an embodiment of the present application.

As an embodiment of the present application, FIG. 5 shows a specific implementation flow of the method S104 for controlling camera shooting provided by the embodiment of the present application, which is described in detail as follows:

C1: acquiring voice data from a beginning of a video conference to a current moment when the current scene is a video conference scene;

C2. dividing speaking regions according to the voice data acquired, and determining region angles of the speaking regions divided. Specifically, the plurality of sound source angles are subtracted two by two, and the difference within a preset angle difference value range is divided into the same speaking region. The angle value obtained by weighted averaging the sound source angles of the same speaking region can be used as the region angle of the speaking region. Further, the number of sound source angles are counted to determine the number of sound source objects, and the speaking regions are divided according to the sound source angle and the number of sound source objects.

C3. acquiring a sound source angle of the new voice data when a new voice data are detected. The new voice data refers to the voice data detected after dividing the speaking region.

C4. determining a speaking region to which the sound source angle of the new voice data belongs. Specifically, the speaking region to which the sound source angle of the new voice data belongs is determined according to the region angle of the speaking region and the sound source angle of the new voice data detected. The speaking region to which the sound source angle of the new speech data belongs is searched by matching the sound source angle of the new voice data with the sound source angle in the divided speaking region.

C5. controlling a turning angle of the camera according to the region angle of the speaking region. If the region angle of the speaking region to which the sound source angle of the new voice data belongs is the orientation angle of the current camera, no adjustment is made, if the region angle of the speaking region to which the sound source angle of the new voice data belongs is not the orientation angle of the current camera, the camera is controlled to move according to the current orientation angle of the camera and the region angle of the speaking region to which the sound source angle of the new voice data belongs, and the turning angle is the difference (the absolute value) between the current orientation angle of the camera and the region angle of the speaking region to which the sound source angle of the new voice belongs.

Optionally, in order to determine the region angle of the speaking region, the step D5 specifically includes:

C51. acquiring the amount n of the voice data from a beginning of the video conference to the current moment, and a voice duration $T_i$ and the sound source angle Ai corresponding to each of the voice data;

C52. determining an angle Ac of the camera to be rotated according to the following formula:

$$Ac = \frac{\sum_{i=1}^{n} A_i \times T_i}{\sum_{i=1}^{n} T_i}$$

Or alternatively, C53. determining an angle Ac of the camera to be rotated according to the following formula:

$$Ac = \sum_{i=1}^{n} Ai$$

Figure 5A:
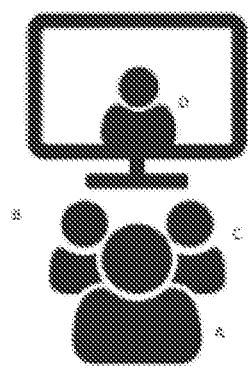
FIG. 5a is a schematic diagram of a video conference scene according to an embodiment of the present application.

In the embodiment of the present application, the video conference scene is as shown in FIG. 5a. The characteristics of the video conference scene are that the angle of the voice distribution is small, the voice duration is difference, and the voice interval is generally short, but the sound source angle varies greatly within a certain range. In this case, the camera is controlled simple follow-up causing the video to be sharply shaken. In the embodiment of the present application, by setting the discussion hotspot region, the change of the sound source angle of the single sound source object is ignored, thereby avoiding frequently rotating of the camera and causing the video sharply shaking.

Optionally, in the embodiment of the present application, the current voice scene is continuously determined to avoid that the voice scene is changed while the shooting mode is unchanged, such as a speaker, after his theme is finished and turn to discuss the problem with other people, after a while, the algorithm will judge that the current mode is changed to the round table conference mode, that is, one voice scene switching to another scene is realized.

In the first embodiment 1 of the present application, the voice data of the sound source object is collected, and then the voice feature is extracted based on the voice data of the sound source object, and then the current voice scene is determined according to the extracted voice feature and the voice feature corresponding to the preset voice scene, and finally, the shooting mode corresponding to the current voice scene is acquired, and the camera is controlled to move according to the shooting mode corresponding to the current voice scene, and the camera uses different shooting modes to control the moving and rotation of the camera according to different voice scenes, which avoids the camera from rotating frequently when a plurality of participants are speaking at the same time, therefore, not only meet the shooting needs, but also improve the shooting efficiency and user experience.

It should be understood that the size of the sequence of the steps in the above embodiments does not imply a sequence of executions, and the order of execution of the processes should be determined by its function and internal logic, and should not be construed as limiting the implementation of the embodiments of the present application.

Embodiment 2

Figure 6:
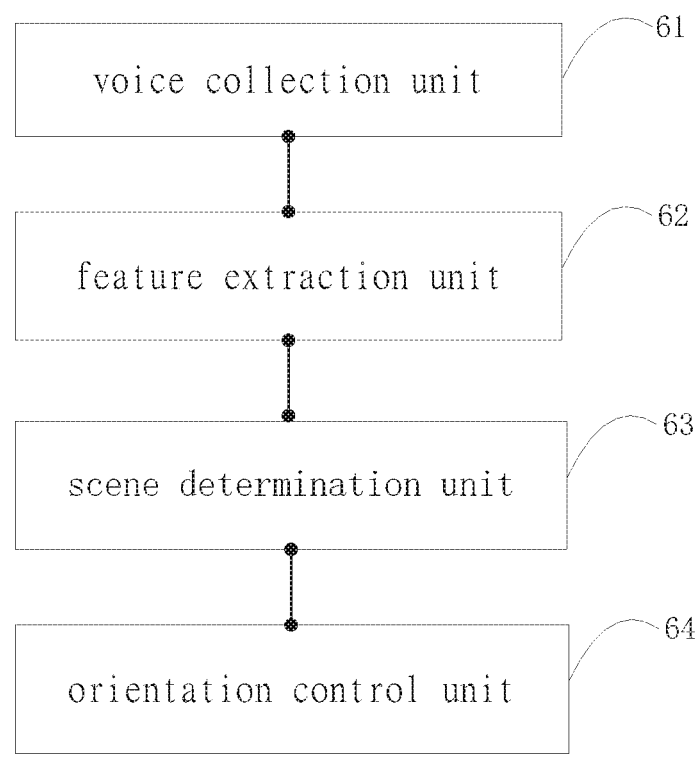
FIG. 6 is a structural block diagram of a device for controlling camera shooting according to an embodiment of the present application.

Corresponding to the method for controlling camera shooting described in the above embodiments, FIG. 6 is a structural block diagram of a device for controlling camera shooting provided by an embodiment of the present application, which may be applied to a smart device, and the smart device may include user device that communicates with one or more core networks via a RAN (Radio Access Network), the user device may be a mobile telephone (or "cellular" telephone) or a computer with a mobile device, etc., for example, the user device may also be portable, pocket-sized Handheld, computer built-in devices that exchange voice and/or data with the RAN. For another example, the user device can be a smart speaker, an intelligent robot, or the like. For the convenience of description, only parts related to the embodiment of the present application are shown.

Referring to FIG. 6, the device for controlling camera shooting includes: a voice collection unit 61, a feature extraction unit 62, a scene determination unit 63, and a orientation control unit 64:

The voice collection unit 61, configured to collect voice data of a sound source object;

a feature extraction unit 62, configured to extract a voice feature based on the voice data of the sound source object;

The scene determination unit 63, configured to determine a current voice scene according to the extracted voice feature and a voice feature corresponding to the preset voice scene; and The orientation control unit 64, configured to acquire a shooting mode corresponding to the current voice scene, and to control movement of the camera according to the shooting mode corresponding to the current voice scene.

Optionally, the voice features includes one or more of a voice duration, a voice interval duration, a sound source angle, a sound intensity of a voice, or a sound frequency of a voice.

Optionally, the scene determination unit 63 includes:

a feature extraction module, configured to extract voice features of a specified amount of the voice data;

a first scene determining module, configured to input the voice features of the specified amount of the voice data into the trained machine learning model to determine a current voice scene.

Optionally, the scene determination unit 63 further includes:

a sample set establishing module, configured to acquire a specified amount of sample voice data, and establish a sample voice data set based on the sample voice data, wherein the sample voice data is marked with voice scenes, and the number of sample voice data of each voice scene is no less than the average number of sample voice data of each voice scene;

a feature vector set establishing module, configured to extract a voice feature according to the sample voice data, and establish a feature vector set based on the extracted voice feature; and a training module, configured to train a decision tree of the sample voice data set according to the feature vector set, until the actual output value of the decision tree is the same as the ideal output value, and the training is completed.

Optionally, the scene determination unit 63 includes:

a sample acquiring module, configured to acquire a specified amount of sample voice data;

a feature determining module, configured to determine a distribution of the sound source angle, a voice duration distribution, and a voice interval time of the sample voice data;

a decision tree constructing module, configured to construct a decision tree according to the distribution of the sound source angle, the voice duration distribution, and the voice interval time of the sample voice data;

a second scene determining module, configured to determine the current voice scene according to the decision tree constructed and the voice features extracted.

Optionally, the orientation control unit 64 includes:

a first voice acquiring module, configured to acquire voice data from a beginning of a video conference to a current moment when a voice scene is the video conference scene;

a region dividing module, configured to divide a speaking region according to the sound source angle acquired of the voice data, and determine a region angle of the speaking region divided;

a voice detection module, configured to acquire a sound source angle of a new voice data when the new voice data is detected,;

an angle matching module, configured to determine a speaking region to which the sound source angle of the new voice data belongs; and a first turning control module, configured to control a turning angle of the camera according to the region angle of the speaking region determined.

Optionally, the first turning control module is specifically configured to acquire a amount n of the voice data from the beginning of the video conference to the current moment, and a voice duration $T_i$ and the sound source angle $Ai$ corresponding to each of the voice data; and determine an angle $Ac$ of the camera to be rotated according to the following formula:

$$Ac = \frac{\sum_{i=1}^{n} A_i \times T_i}{\sum_{i=1}^{n} T_i}$$

Or, the first turning control module is further configured to determine an angle $Ac$ of the camera to be rotated according to the following formula:

$$Ac = \sum_{i=1}^{n} Ai$$

Optionally, the orientation control unit 64 includes:

a second voice acquiring module, configured to if a first voice data is detected, acquire a first sound source angle of the first voice data when the current voice scene is a round table conference scene;

a second turning module, configured to control movement of the camera to a first sound source object corresponding to the first sound source angle according to the first sound source angle;

a first prediction module, configured to predetermine a second sound source object sending the voice data according to a scheduling mode corresponding to the round table conference scene before the first voice data ends;

the second turning module is further configured to control movement of the camera to the second sound source object in advance according to a sound source angle of the second sound source object;

a second prediction module, configured to predetermine a second sound source object sending voice data and a third sound source object sending voice data according to a scheduling mode corresponding to the round table conference scene when the first voice data end; and a third turning module, configured to control movement of the camera to an intermediate position of the second sound source object and the third sound source object in advance according to the sound source angle of the second sound source object and the sound source angle of the third sound source object.

In the embodiment 2 of the present application, the voice data of the sound source object is collected, and then the voice feature is extracted based on the voice data of the sound source object, and then the current voice scene is determined according to the extracted voice feature and the voice feature corresponding to the preset voice scene, and finally, the shooting mode corresponding to the current voice scene is acquired, and the camera is controlled to move according to the shooting mode corresponding to the current voice scene, and the camera uses different shooting modes to control the moving and rotation of the camera according to different voice scenes, which avoids the camera from rotating frequently when a plurality of participants are speaking at the same time, therefore, not only meet the shooting needs, but also improve the shooting efficiency and user experience.

Embodiment 3

Figure 7:
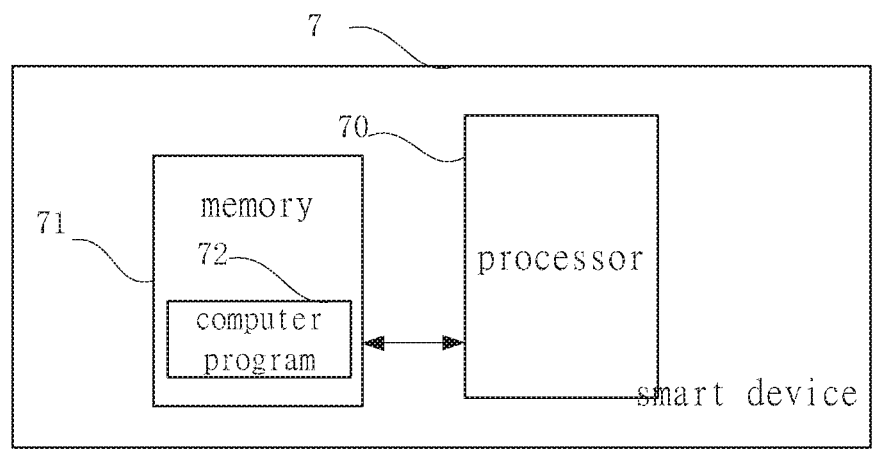
FIG. 7 is a schematic diagram of a smart device according to an embodiment of the present application.

FIG. 7 is a schematic diagram of a smart device according to an embodiment of the present application. As shown in FIG. 7, the smart device 7 of this embodiment includes: a processor 70, a memory 71, and a computer program 72 stored in the memory 71 and operable on the processor 70, such as a shooting control program. When the processor 70 executes the computer program 72, the steps in the above embodiments of the respective method for controlling camera shootings are implemented, such as steps 101 to 104 shown in FIG.1. Alternatively, when the processor 70 executes the computer program 72, the functions of the various modules/units in the various devices embodiments described above are implemented, such as the functions of the units 61-64 shown in FIG. 6.

Illustratively, the computer program 72 can be divided into one or more modules/units that are stored in the memory 71 and executed by the processor 70 to implement this application. The one or more modules/units may be a series of computer program instruction segments capable of performing a particular function, the instruction segments being used to describe the execution of the computer program 72 in the smart device 7. For example, the computer program 72 can be divided into a voice collection unit, a feature extraction unit, a scene determination unit, and a orientation control unit, and the specific functions of each unit are as follows:

the voice collection unit, configured to collect voice data of a sound source object;

the feature extraction unit, configured to extract a voice feature based on the voice data of the sound source object;

the scene determination unit, configured to determine a current voice scene according to the extracted voice feature and a voice feature corresponding to the preset voice scene; and the orientation control unit, configured to acquire a shooting mode corresponding to the current voice scene, and control movement of the camera according to the shooting mode corresponding to the current voice scene.

The smart device 7 can be a smart device such as a smart speaker, a smart camera, and an intelligent robot. The smart device 6 may include, but is not limited to, a processor 70, a memory 71. It will be understood by those skilled in the art that FIG. 7 is merely an example of the smart device 7, and does not constitute a limitation on the smart device 7, and may include more or less components than those illustrated, or combine some components, or different components. For example, the smart device may further include an input and output device, a network access device, a bus, and the like.

The processor 70 may be a central processing unit (CPU), or may be another general-purpose processor, a digital signal processor (DSP), an application specific integrated circuit (ASIC), Field-Programmable Gate Array (FPGA) or other programmable logic device, discrete gate or transistor logic device, discrete hardware components, etc. The general-purpose processor may be a microprocessor, or the processor is a conventional processor of any others or the like.

The memory 71 may be an internal storage unit of the smart device 7, such as a hard disk or a memory of the smart device 7. The memory 71 may also be an external storage device of the smart device 7, such as a plug-in hard disk equipped on the smart device 7, a smart media card (SMC), and a secure digital (SD) card, flash card, etc. Further, the memory 71 may also include both an internal storage unit of the smart device 7 and an external storage device. The memory 71 is used to store the computer program and other programs and data required by the smart device. The memory 71 can also be used to temporarily store data that has been output or is about to be output.

It can be clearly understood by the one of ordinary skill in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, please refer to a corresponding process in the aforesaid method embodiments, it is not repeatedly described herein.

In the aforesaid embodiments, the description of each of the embodiments is emphasized respectively, regarding a part of one embodiment which isn't described or disclosed in detail, please refer to relevant descriptions in some other embodiments.

Those skilled in the art will notice that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, but such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer storage medium. Based on this understanding, a whole or part of flow process of implementing the method in the aforesaid embodiments of the present application can also be accomplished by the computer programs configured to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory).

As stated above, the aforesaid embodiments are only intended to explain but not to limit the technical solutions of the present application. Although the present application has been explained in detail with reference to the above-described embodiments, it should be understood for the one of ordinary skill in the art that, the technical solutions described in each of the above-described embodiments can still be amended, or some technical features in the technical solutions can be replaced equivalently; these amendments or equivalent replacements, which won't make the essential of corresponding technical solution to be broken away from the spirit and the scope of the technical solution in various embodiments of the present application, should all be included in the protection scope of the present application.

What is claimed is:

1. A method for controlling camera shooting comprising steps of:
   collecting voice data of a sound source object;
   extracting a voice feature based on the voice data of the sound source object;
   determining a current voice scene according to the extracted voice feature and a voice feature corresponding to a preset voice scene, wherein the voice feature comprises one or more selected from a group consisting of a voice duration, a voice interval duration, a sound source angle, a sound intensity of a voice, or a sound frequency of a voice; and
   acquiring a shooting mode corresponding to the current voice scene, and controlling the movement of the camera according to the shooting mode corresponding to the current voice scene, wherein the step of acquiring the shooting mode corresponding to the current voice scene, and controlling movement of the camera according to the shooting mode corresponding to the current voice scene comprises:
   acquiring a first sound source angle of the first voice data if a first voice data of a first sound source object is detected when the current voice scene is determined to be a round table conference scene;
   controlling the movement of the camera to the first sound source object corresponding to the first sound source angle according to the first sound source angle;
   predetermining, according to a scheduling mode corresponding to the round table conference scene, a subsequent second sound source object which sends voice data subsequently when the first voice data end;
   controlling in advance movement of the camera to the second sound source object according to a sound source angle of the second sound source object; or alternatively predetermining the second sound source object sending voice data and a third sound source object sending voice data according to the scheduling mode corresponding to the round table conference scene when the first voice data end; and
   controlling in advance movement of the camera to an intermediate position between the second sound source object and the third sound source object according to the sound source angle of the second sound source object and the sound source angle of the third sound source object.

2. The method of claim 1, wherein the step of extracting a voice feature based on the voice data of the sound source object comprises:
   extracting voice features of a specified amount of the voice data;
   determining the current voice scene by inputting the specified amount of the voice data into a trained machine learning model.

3. The method of claim 2, wherein steps of training the machine learning model comprises:
   acquiring a specified amount of sample voice data, and establishing a sample voice data set based on the sample voice data, wherein the sample voice data is marked with a voice scene, and the number of the sample voice data of each voice scene is no less than an average of the number of the sample voice data of each voice scene;
   extracting voice features according to the sample voice data, and establishing a feature vector set based on the voice features extracted;
   training a decision tree of the sample voice data set according to the feature vector set until an actual output value of the decision tree is the same as an ideal output value, and the training is completed.

4. The method of claim 1, wherein the step of determining the current voice scene according to the extracted voice feature and the voice feature corresponding to the preset voice scene comprises:
   acquiring a specified amount of a sample voice data;
   determining a distribution of the sound source angle, a voice duration distribution, and a voice interval time of the sample voice data;
   constructing a decision tree according to the distribution of the sound source angle, the voice duration distribution, and the voice interval time of the sample voice data acquired;
   determining a current scene according to the decision tree constructed and the voice features acquired.

5. The method of claim 1, wherein the step of acquiring the shooting mode corresponding to the current voice scene, and controlling the movement of the camera according to the shooting mode corresponding to the current voice scene comprises:
   acquiring voice data from a beginning of a video conference to a current moment when a current scene is a video conference scene;
   dividing speaking regions according to the voice data acquired, and determining region angles of the speaking regions divided;
   acquiring a sound source angle of the new voice data when the new voice data are detected;
   determining a speaking region to which the sound source angle of the new voice data belongs;
   controlling a turning angle of the camera according to the region angle of the speaking region.

6. The method of claim 5, wherein the step of controlling the turning angle of the camera according to the region angle of the speaking region comprises:
   acquiring the amount n of the voice data from the beginning of the video conference to the current moment, and a voice duration $T_i$ and the sound source angle $A_i$ corresponding to each of the voice data;
   determining an angle $A_c$ of the camera to be rotated according to the following formula:

$$Ac = \frac{\sum_{i=1}^{n} A_i \times T_i}{\sum_{i=1}^{n} T_i}.$$

7. The method of claim 5, wherein the step of controlling the turning angle of the camera according to the region angle of the speaking region comprises:
   acquiring the amount n of the voice data from the beginning of the video conference to the current moment, and the sound source angle Ai;
   determining an angle Ac of the camera to be rotated according to the following formula:

$$Ac = \sum_{i=1}^{n} Ai.$$

8. A smart device, comprising: a memory, a processor, and a computer program stored in the memory and executable by the processor, wherein when the processor executes the computer program, the steps claimed according to claim 1 are implemented.

9. A computer storage medium, the computer storage medium is stored with a computer program, wherein when the computer program is executed by a processor, the steps claimed according to claim 1 are implemented.

* * * * *